US011880273B2

United States Patent
Meyer

(10) Patent No.: US 11,880,273 B2
(45) Date of Patent: Jan. 23, 2024

(54) METHOD FOR INSTALLING A PROGRAM CODE PACKET ONTO A DEVICE, DEVICE, AND MOTOR VEHICLE

(71) Applicant: Audi AG, Ingolstadt (DE)

(72) Inventor: Jürgen Meyer, Haunstetten (DE)

(73) Assignee: AUDI AG, Ingolstadt (DE)

( * ) Notice: Subject to any disclaimer, the term of this patent is extended or adjusted under 35 U.S.C. 154(b) by 580 days.

(21) Appl. No.: 17/049,879

(22) PCT Filed: Aug. 19, 2019

(86) PCT No.: PCT/EP2019/072104
§ 371 (c)(1),
(2) Date: Oct. 22, 2020

(87) PCT Pub. No.: WO2020/048756
PCT Pub. Date: Mar. 12, 2020

(65) Prior Publication Data
US 2021/0240563 A1    Aug. 5, 2021

(30) Foreign Application Priority Data
Sep. 4, 2018  (DE) .................... 10 2018 215 011.7

(51) Int. Cl.
*G06F 11/10*  (2006.01)
*G06F 9/4401*  (2018.01)

(52) U.S. Cl.
CPC ........ *G06F 11/1004* (2013.01); *G06F 9/4403* (2013.01); *G06F 9/4406* (2013.01)

(58) Field of Classification Search
CPC ...... G06F 11/1004; G06F 21/572; G06F 8/61; G06F 8/65
See application file for complete search history.

(56) References Cited

U.S. PATENT DOCUMENTS 6,223,284 B1 * 4/2001 Novoa ................. G06F 21/572
709/216
6,618,637 B1 * 9/2003 Kerner ................ G05B 19/408
700/173

(Continued)

FOREIGN PATENT DOCUMENTS

CN    105938433 A    9/2016
CN    108885668 A    11/2018

(Continued)

OTHER PUBLICATIONS

International Preliminary Report on Patentability directed to related International Patent Application No. PCT/EP/2019/072104, dated Aug. 12, 2020, with attached English-language translation; 15 pages.

(Continued)

*Primary Examiner* — Albert Decady
*Assistant Examiner* — Enamul M Kabir
(74) *Attorney, Agent, or Firm* — Sterne, Kessler, Goldstein & Fox P.L.L.C.

(57) ABSTRACT

The present disclosure relates to a method for installing a program code packet onto a device. A processor device of the device receives the program code packet via a first data connection from a device-external data source and forms a checksum value in response to the received program code packet. A controller which differs from the processor device is operated in the device. The controller receives a reference checksum value from a specified device-external update server device via a second data connection, which differs from the first data connection, and the checksum value formed by the processor device from same, and a specified installation procedure for installing the program code packet on the processor device is initiated by the controller in the (Continued)

processor device only in the event that the checksum value and the reference checksum value are identical.

10 Claims, 1 Drawing Sheet

(56) References Cited

U.S. PATENT DOCUMENTS

| | | | | |
|---|---|---|---|---|
| 8,078,861 | B1* | 12/2011 | Jarrett, Jr. | G06F 8/65 |
| | | | | 455/92 |
| 8,607,343 | B2* | 12/2013 | Gosnell | G06F 21/575 |
| | | | | 713/168 |
| 8,898,481 | B1* | 11/2014 | Osburn, III | H04L 67/12 |
| | | | | 713/192 |
| 9,015,837 | B1* | 4/2015 | De Los Reyes | G06F 8/65 |
| | | | | 717/172 |
| 9,934,383 | B2* | 4/2018 | Buhler | G06F 21/6281 |
| 9,965,632 | B2* | 5/2018 | Zarakas | G06F 21/77 |
| 10,180,842 | B2* | 1/2019 | Moon | G06F 9/4406 |
| 2005/0149923 | A1* | 7/2005 | Lee | G06F 8/65 |
| | | | | 717/172 |
| 2009/0019435 | A1* | 1/2009 | Piechowski | G06F 8/65 |
| | | | | 717/176 |
| 2013/0047144 | A1* | 2/2013 | Chalmers | G06F 8/654 |
| | | | | 717/168 |
| 2016/0259584 | A1* | 9/2016 | Schlottmann | H04L 9/0891 |
| 2017/0222815 | A1 | 8/2017 | Meriac et al. | |
| 2017/0337380 | A1* | 11/2017 | Domke | H04L 63/06 |
| 2018/0145991 | A1* | 5/2018 | McCauley | H04L 9/0891 |
| 2019/0034191 | A1* | 1/2019 | Fox | G06F 21/577 |
| 2019/0095647 | A1 | 3/2019 | Merli et al. | |

FOREIGN PATENT DOCUMENTS

| | | |
|---|---|---|
| DE | 10319365 A1 | 11/2004 |
| DE | 102012220132 A1 | 5/2014 |
| DE | 102014219322 A1 | 3/2016 |
| DE | 102016200775 A1 | 7/2017 |
| WO | WO 2018/078406 A1 | 5/2018 |

OTHER PUBLICATIONS

International Search Report and Written Opinion of the International Searching Authority directed to related International Patent Application No. PCT/EP2019/072104, dated Dec. 6, 2019, with attached English-language translation; 18 pages.

Written Opinion of the International Preliminary Examining Authority (Form PCT/IPEA/408) directed to related International Patent Application No. PCT/EP2019/072104, dated Jun. 2, 2020, with attached English-language translation; 15 pages.

* cited by examiner

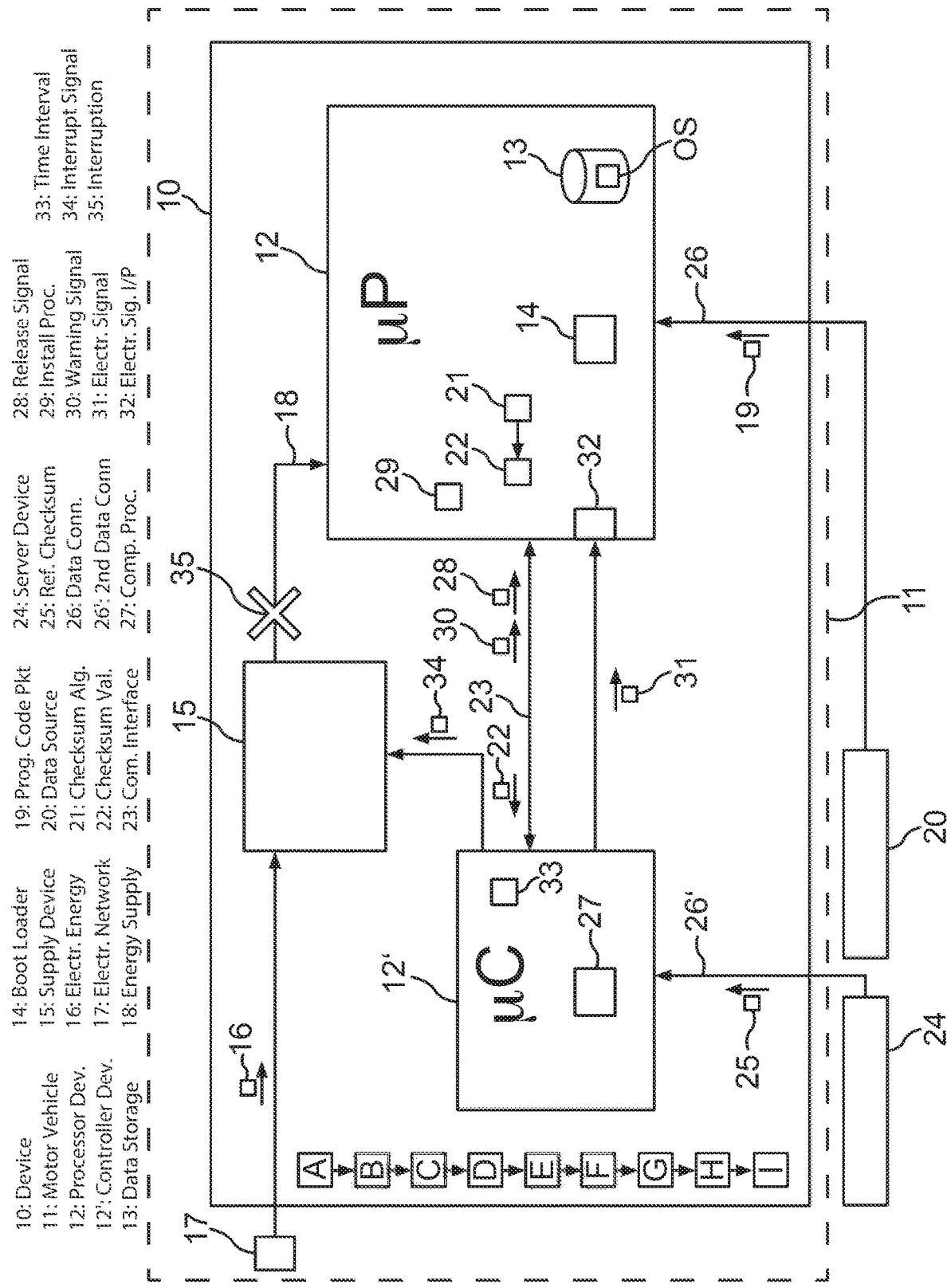

METHOD FOR INSTALLING A PROGRAM CODE PACKET ONTO A DEVICE, DEVICE, AND MOTOR VEHICLE

TECHNICAL FIELD

The present disclosure relates to a method for importing or installing a program code packet in a device, for example in a mobile terminal device or in a control unit of a motor vehicle. By importing the program code packet, it is made available in the device as executable software. The program code packet can contain, for example, an operating system for the device and/or the import results in an update of the operating software or the operating system in the device. The present disclosure also includes a device that can be operated according to the method, and a motor vehicle with such a device.

BACKGROUND

A processor device can be provided in a control unit of a motor vehicle, which can provide a microprocessor or a plurality of microprocessors and can use an operating system such as Linux, or Posix, or QNX® for the operation. The following sequence can be provided for updating software of the operating system or generally of the processor device. First, a program code packet, for example a so-called flash file, including a reference checksum value (for example HASH value) is received via a data connection from a device-external data source. The data connection can be formed, for example, on the basis of an Ethernet and/or CAN bus (CAN—Controller Area Network) and/or a Flexray bus. After the program code packet has been completely received and stored in the processor device, the processor device itself calculates a checksum value for the program code packet and compares it with the reference checksum value received together with the program code packet and thus verifies it. This makes it possible to determine whether the program code packet is integer, i.e., whether it was transmitted without errors and/or was not manipulated. If the program code packet is integer, the processor device starts an installation procedure which can provide that an update flag or update bit is set and the processor device then carries out a reset. After the reset, the processor device is booted by a bootloader during a restart. The bootloader recognizes the update flag set and starts an update operation, which can provide that at least part of the operating software or generally the existing software of the processor device is replaced or supplemented by means of the program code packet. This operation is also known as flashing. The checksum-based verification described can alternatively also take place in the bootloader itself.

The verification known from the prior art using checksum values and the installation procedure can be used for targeted manipulation of the device, if the mechanism for comparing the checksum values can be manipulated in the running operating system in order to simulate to the processor device that the checksum value and the reference checksum value match, even if they indeed do not match. A manipulated program code packet can then also be transmitted in the device, and this manipulated program code packet would then be installed in the device by means of the installation procedure.

The import of a program code packet into a control unit of a motor vehicle is described, for example, in DE 10 2016 200 775 A1. In order to protect against a manipulated program code packet, a control unit is used to identify possible risks to a vehicle from cyberattacks and to subject these risks to an analysis, wherein an unplanned writing of a flash storage of individual control units with new firmware is recognized. The disadvantage of this procedure is that an additional control unit with its own, powerful processor device is necessary in order to be able to recognize the manipulation of processor devices of other control units.

DE 103 19 365 A1 discloses a method to execute a delimited runtime environment within an individual control unit by means of its processor device, in which environment the software can be executed from received program code packets. In this way, any malicious code contained in the program code packet cannot spread to other parts of the device. The disadvantage of this procedure is that it is impossible for an operating system of the control unit to operate in the own runtime environment thereof, so that there is no protection for the operating system itself.

DE 10 2014 219 322 A1 discloses a method for an update of a vehicle control in which, after installing a program code packet, that part of a control unit that is affected by the installation of the program code packet is initially operated in isolation from the remaining part in order to carry out tests, and this part of the control unit can only be used again after a faultless installation has been recognized by means of a release. The disadvantage of this procedure is that it is not possible to fall back on the simple and quick check using the checksum value. This makes the installation procedure complex.

BRIEF DESCRIPTION OF DRAWINGS/FIGURES

FIG. 1 is a schematic representation of an embodiment of a device according to an embodiment of a method that can be carried out, as described herein.

DETAILED DESCRIPTION

The present disclosure is based on the object of preventing the manipulation of a device, as can be caused by malware.

The object is achieved by the subject matter of the independent claims. Advantageous embodiments of the present disclosure are described by the dependent claims, the following description, and the drawing.

In some embodiments, the present disclosure provides a method for importing or installing a program code packet in a device. The program code packet can be, for example, an update or an update version for an operating system of a processor device of the device or a new or revised application program for the processor device of the device. Processor device means an arrangement of at least one microprocessor and an associated data storage for storing software for operating the device and in particular the processor device. "Importing" is understood to mean that the program code packet is installed, i.e., made available for execution in the device. The program code packet can be provided, for example, as a file or as a group of a plurality of files. A known format for such a program code packet is the so-called flash file, which can be used to carry out what is known as flashing in a storage of the processor device, i.e., to overwrite the storage content with the data of the program code packet. For the installation, said processor device of the device first receives the program code packet via a data connection from a device-external data source. The data connection is referred to in this case as the first data connection, since a second data connection will be described below. The device-external data source can be, for example, an Internet server or another device connected to the device. As is known from the prior art, in the method the processor device forms a checksum value for the received program code packet. Algorithms for forming a checksum value are known per se from the prior art. A checksum value can be a so-called HASH value, for example. A possible algorithm for forming the checksum value is the algorithm SHA1.

In some embodiments, the checksum value can be used to recognize whether the content of the program code packet has been manipulated. For this purpose, the "correct" checksum value, i.e., the reference checksum value, is necessary as a comparison. However, if the checksum value just formed is compared by the processor device itself with the reference checksum value in the manner described above, this comparison operation or this comparison procedure can be manipulated by a hacker in order to cover up a manipulation of the program code packet. According to some embodiments, as described herein, a controller which differs from the processor device is therefore operated in the device. The controller receives a reference checksum value from a specified device-external update server device via a second data connection, which differs from the first data connection. The update server device can be formed, for example, by an Internet server or by a device that is different from the device. The update server device can be operated, for example, by a manufacturer of the program code packet.

In some embodiments, the controller is therefore independent of the processor device in terms of performing a calculation or a comparison. When the reference checksum value is received, the "correct" checksum value is known in the controller, i.e., the reference checksum value that must result for the program code packet in the unmanipulated state. The unmanipulated state can be ensured, for example, when the program code packet is still with the manufacturer of the program code packet. The controller now additionally receives the checksum value formed by the processor device from the processor device. Thus, the comparison between this checksum value and the reference checksum value can now be carried out by the controller independently or separately from the processor device. This means that the comparison cannot be manipulated by malware, which, for example, could already have been installed in the processor device.

In some embodiments, when the checksum value and the reference checksum value are the same, a specified installation procedure is subsequently initiated in the processor device by the controller, for installing the program code packet in the processor device. By way of a non-limiting example, the decision as to whether the program code packet is actually installed in the processor device of the device, i.e., is imported, lies with the controller and not with the processor device itself.

In some embodiments, in the event that the operation of a processor device has already been manipulated by malware and thus, for example, the comparison of checksum values can be influenced, manipulated program code packet cannot be installed. Since for this installation, the comparison of the checksum value of the program code packet with a reference checksum value is carried out outside the processor device by an independent controller. A hacker, who thus gains control over the processor device and now wants to install a further program code packet with further malicious code, could not do this if he did not get control over the controller. Since the controller can be formed, for example, on the basis of program codes in a read-only memory (ROM), such manipulation is then not possible.

In some embodiments, the described initiating of the installation procedure, as is done by the controller, comprises that a release signal is sent out to the processor device by the controller. When receiving the release signal, a restart of the processor device is initiated by the processor device. A restart comprises, on the one hand, a reset, i.e., the terminating of the operation of the processor device and the resetting of the operating state or program counter of the processor device, and, on the other hand, a reboot, i.e., the restart of the operation by the processor device after the reset. In some embodiments, the restart is initiated by the processor device itself that causes the processor device to store a calculation result and/or a processing status of a task before the restart is carried out preventing data loss. By way of a non-limiting example, the release signal can be a digital message that can be transmitted via a digital communication interface (e.g., I2C bus), or a voltage signal that is applied as a constant, discrete analog signal to an input port or an input connection of the processor device.

In some embodiments, the installation procedure comprises the controller forcing the processor device to be reset from outside the controller after a specified period of time. The period of time can be measured, for example, from the determination that the checksum value and the reference checksum value are the same, or from the transmission or generation of said release signal. The operation of the processor device is interrupted or aborted by the reset and the processor device is reset in the manner described, i.e., it begins a reboot. By forcing the reset after the specified period of time, it is ensured that, in the event that the program code packet has a checksum value that matches the reference checksum value, it is also ensured that this program code packet is actually installed, in that the software which is already running on the processor device is interrupted by the reset during the operation. This prevents an already manipulated processor device from preventing an update (installation of a program code packet) by blocking the reset. The reset can be forced by the controller by means of a reset signal to a reset pin of the processor device.

In some embodiments, in order to force the reset by the controller, an electrical supply device, through which the processor device is supplied with electrical energy, is controlled for interrupting an energy supply to the processor device. By way of a non-limiting example, the forced reset is not even requested or enforced by the processor device itself, but the controller signals to the electrical supply device, which is located outside the processor device, that the energy supply must be interrupted for the processor device. The processor device is thus reliably stopped or interrupted during operation. Because an interruption of the energy supply, for example the voltage supply, leads to said reset in a processor device. Since the supply device is activated, malicious code on the processor device cannot influence this forced reset.

In some embodiments, said installation procedure, which is initiated in the case of a program code packet with the correct checksum value, comprises that an electrical signal, in particular an electrical voltage level that is constant during this time, is set at an electrical signal input of the processor device by the controller during the restart of the processor device, in particular during the reboot. By way of a non-limiting example, an electrical signal is generated by the controller at a signal input, for example a GPIO port (GPIO—General Purpose Input Output), which can then be read in or interpreted from within the processor device. Correspondingly, a bootloader of the processor device replaces an operating software of the processor device with the program code packet in the event that the signal is present at the signal input during the restart, in particular during the reboot. A bootloader is a program, which is executed during a restart of the processor device and which copies or loads the actual operating system of the processor device into a RAM (Random Access Memory) of the processor device and then transfers or surrenders control of the processor device to this operating system. In addition, the bootloader of the processor device also has an installation routine, which ensures that the operating system or the operating software of the processor device in the data storage of the processor device is overwritten with the program code packet or is replaced by the program code packet. This installation routine is initiated by the controller using the signal at the signal input. This ensures that even if the previously existing operating system or the previously existing operating software of the processor device is manipulated, the controller can ensure by setting the signal that this manipulated operating software is replaced by the program code packet. Since this happens during the reboot by the bootloader, the manipulated operating software of the processor device itself cannot influence this operation. This allows an update or replacement of the operating software on the basis of the program code packet.

In some embodiments, the controller is operated with an operating system, which is different from an operating system of the processor device. By way of a non-limiting example, the two operating systems are based on different technologies or implementations. For example, an operating system can be one of the following: Linux, Windows, QNX, a Posix based operating system. Accordingly, malicious code (i.e., software for manipulation) that is designed for the operating system of the processor device cannot be used for this or is ineffective when it comes to manipulating the controller. A hacker would therefore have to successfully carry out two different types of manipulation attempts instead of just one manipulation attempt in order to circumvent the protection against malware formed by the method.

In some embodiments, the controller is provided by a microcontroller. Such a microcontroller can be permanently programmed, i.e., have non-changeable operating software, which can be stored in a ROM, for example. Furthermore, a microcontroller can be operated with less electrical power than a processor device having at least one microprocessor.

The present disclosure also comprises a device protected by the method described in accordance with various embodiments, as described herein. The device has a processor device and an additional controller of the type described. Overall, the device is designed to carry out an embodiment of the method, as described herein. With the processor device, the device can thus have at least one microprocessor and a data storage for operating software and at least one application software that can be executed by the at least one microprocessor. Furthermore, to protect the processor device when installing a program code packet, the additional controller is provided, which can be implemented or provided in the manner described, for example on the basis of a microcontroller.

In some embodiments, the device is a control unit for a motor vehicle. The motor vehicle can thus be protected against manipulated software or malware being installed in its control unit. In some embodiments, the device is a mobile terminal device. Such a mobile terminal device can be, for example, a smartphone, or a tablet PC, or a smartwatch. In some embodiments, the device is a stationary computing device, for example a workstation PC (PC—Personal Computer), or a server, or a cloud computer.

In connection with the configuration of the device as a control unit, the present disclosure also includes a motor vehicle with such a device that is provided in the motor vehicle. The motor vehicle is thus protected against the influence of malware. The motor vehicle according to various embodiments, as described herein, is preferably designed as a car, in particular as a passenger car or truck.

Embodiments of the present disclosure are described below by way of example.

FIG. 1 is a schematic representation of an embodiment of a device according to an embodiment of a method that can be carried out, as described herein.

In accordance with some embodiments, the described components of the embodiments each represent individual features which are to be considered to be independent of one another and which each further may also be supplemented by further features, which have already been described.

FIG. 1 is a schematic representation of an embodiment of a device according to an embodiment of a method that can be carried out, as described herein. FIG. 1 shows a device 10, which can be, for example, an electronic control unit (ECU) that can be provided in a motor vehicle 11. The device 10 can also be, for example, a mobile terminal device that a user can carry with him, or a stationary computing device that can be provided as a workstation computer in an office, for example, or a stationary server device that can be operated as a server computer, for example in a data center. In the following, for the sake of clarity, it is assumed that the device 10 is an electronic control unit for a motor vehicle 11. However, the statements also apply accordingly to other configurations of the device 10.

A processor device 12, which can have at least one microprocessor, can be provided in the device 10, which is why the processor device 12 is also referred to below as a microprocessor μP. The processor device 12 can furthermore have a data storage 13 in which operating software OS (operating system) and/or at least one application software for the processor device 12 can be stored. For a start or a boot-up or boot process of the processor device 12, the latter can have a boot loader 14.

An electrical supply device 15 for the processor device 12 can be provided in the device 10. Such a supply device 15 can be configured, for example, as a power supply unit of the device 10. The supply device 15 can, for example, receive electrical energy 16 from a device-external electrical network 17 and control or define an energy supply 18 of the electrical energy 16 for the processor device 12. In the case of a motor vehicle 11, the network 17 can be, for example, the on-board electrical system of the motor vehicle 11.

As shown in FIG. 1, the device 10 can furthermore have a controller 12' which can be operated independently of the processor device 12 and which can be formed, for example, on the basis of a microcontroller. In the following, the controller 12' is therefore also referred to as a microprocessor μC.

In the example shown, it may be necessary that the operating software OS must be renewed, i.e., that an update of the operating software should be carried out. For this purpose, the new operating software can be transmitted as a program code packet 19 to the processor device 12 via a first data connection 26. The processor device 12 can receive the program code packet 19, for example, from a device-external data source 20, of which the processor device 12 does not know how trusted it is, which means that it is not known whether the program code packet 19 actually contains the functionalities intended by the manufacturer or operator of the operating software OS or whether it is a manipulated program code packet which could contain malware or malicious code. It can therefore be provided that, by means of an algorithm 21 for a checksum, for example a HASH algorithm, a checksum value 22, for example a HASH value, is calculated for the received program code packet 19.

The verification or checking of this checksum value 22 is not carried out in the device 10 by the processor device 12 itself, so that even in the event that the processor device 12 has already been manipulated and such a verification of the checksum value 22 could be impaired, it is impossible for a hacker, because the check takes place outside of the processor device 12. For this purpose, the calculated checksum value 22 can be transmitted to the controller 12' via a communication interface 23. The communication interface 23 can for example be based on a digital data connection, for example a serial data connection or a parallel data connection, for example a data bus. For the comparison, the controller 12' can receive a reference checksum value 25 from an update server device 24 via a second data connection 26'. The update server device 24 can be provided, for example, by the operator or manufacturer of the operating software OS. For example, it can be a server on the Internet. The second data connection 26', which is operated or established between the update server device 24 and the controller 12', can have end-to-end encryption, as can be provided in a manner known per se, for example on the basis of a public key encryption method. For example, a TLS protocol (TLS—Transport Layer Security) can be used. The second data connection 26' is in particular a data connection different from the first data connection 26, i.e., the program code packet 19 is transmitted over a first data connection 26 separately from the reference checksum value 25, which is transmitted over the second data connection 26'. Both data connections 26, 26' can each be based, for example, on a communication connection via the Internet and/or on a vehicle-internal bus communication, as has already been described.

A comparison between the calculated checksum value 22 of the processor device 12 and the reference checksum value 25 can be carried out by the controller 12' using a comparison procedure 27. If the two checksum values 22, 25 are identical, a release signal 28 can be sent out to the processor device 12 by the controller 12', for example via the communication interface 23. The release signal 28 can signal to the processor device 12 that the program code packet 19 received by it is correct or in order or valid. The processor device 12 can then start an installation procedure 29, which can consist of, for example, initially storing current program states or calculation states in the data storage 13 or in another data storage, and subsequently a reset of the processor device 12 is initiated. If, on the other hand, the two checksum values 22, 25 are not the same, a warning signal 30 can be sent out to the processor device 12 by the controller 12' instead of the release signal 28. The warning signal 30 can signal the processor device 12 that a manipulation attempt is present. A corresponding defense measure can then be initiated by the processor device 12, it being possible to provide a defense measure known per se from the prior art.

After the reset, the processor device 12 can restart by means of the bootloader 14. The controller 12' can use an electrical signal 31, which the controller 12' can apply to an electrical signal input 32 of the processor device 12, to signal that the bootloader 14 should not start the previous operating software OS already stored in the data storage 13, but it should rather first replace said operating software by the software in the program code packet 19 and then start the newly installed operating software OS. The bootloader 14 can always do this when the signal 31 is present at the signal input 32.

In order to ensure that the reset of the processor device 12 is not prevented by a hacker attack that has already taken place or a manipulation of the processor device 12 that has already taken place, the controller 12' can provide that after sending out the release signal 28 to the electrical supply device 15 an interrupt signal 34 is sent out after a specified time interval 33. When receiving the interruption signal 34, the supply device 15 can interrupt the energy supply 18 for a specified period of time, for example for a period of less than a minute, in particular less than ten seconds, by means of an interruption 35, whereby the reset of the processor device 12 is forced from outside the same.

In accordance with some embodiments, it is provided that a so-called flash file for overwriting operating software of the processor device is provided as the program code packet.

The final check and release of an update (program code packet) of the μP (processor device 12) is not carried out by the μP itself but by an additional small μC (controller 12'). The μC is seen as a "trusted area" and it makes the final decision on the release of the update. It is not the part of a control unit that is to be updated, which is considered to be an untrusted area that is responsible for the decision to update, but rather the secure side. This prevents third-party software from being loaded onto a compressed μP. The result is an increase in security through additional security hurdles.

A simple attack on the μP is no longer sufficient to load malicious SW (software) onto the ECU. This means that there is an increase in the security mechanisms. A possible malicious SW on the μP could nevertheless be reprogrammed.

An embedded operating system that is not freely accessible is therefore preferably used on the μC, which, in particular, is completely different from the operating system on the μP. The μC can be viewed as a trusted area because the SW is not freely available to third parties and is only operated by specified programmers (i.e., for example, the OEM—Original Equipment Manufacturer).

In accordance with some embodiments, a HASH value is calculated as a reference checksum value by the providing entity or update server device via the flash file (program code packet). This HASH value is not attached to the flash file, but encrypted end to end and sent separately to the μC only. The flash file itself is sent to the μP. By way of a non-limiting example, the calculation of the HASH value takes place using the flash files on the as only it has the computing power to process large flash files. μP provides the calculated HASH value as a calculated checksum value to the e.g., via the internal communication interface.

The HASH values are verified or compared on the μC. After valid verification, the μC releases the update and notifies the μP of the update release via the internal communication interface. The μC gives the μP time to close its file systems and shut down. After the specified period of time has elapsed, the μC actively switches off the power supply of the μP. If malware on the g would prevent a shutdown, the g is nevertheless forced to operate the bootloader 14 by switching the power supply on and off.

At the same time, the μC sets the update release GPIO to HIGH. The bootloader 14 is started when the μP is started up or booted. The bootloader reads the update release GPIO and then starts the update. Without a pending update release GPIO, the bootloader would run through the standard boot routine.

The following sequence of installation of the program code packet can thus result overall in the device 10:

A) flash file without HASH value is transmitted to the µP.
B) HASH value is encrypted and transmitted to the µC.
C) the µP calculates HASH value via flash file.
D) the µP communicates HASH value to the µC.
E) the µC compares the calculated HASH value with the received HASH value and then releases the update.
F) the µC informs the µP that the update is released and asks it to restart and switch to the bootloader.
G) So that the µP switches safely to the bootloader (if it were compromised and does not restart), the µC switches the power supply of the µP off and on again, so that the µP restarts safely.
H) the µC switches the update release GPIO at the same time in order to communicate the update mode to the µP bootloader.
I) the µP reads the update release GPIO in the bootloader and switches to the update mode and carries out the update.

Overall, the examples show how various embodiments as described in this disclosure can provide a secure update mechanism for a microprocessor through an additional microcontroller security level.

The invention claimed is:

1. A method for installing a program code packet onto a device comprising a processor device and a controller, the method comprising:
    receiving, at the processor device, the program code packet via a first data connection from a device-external data source;
    building, at the processor device, a checksum value in response to the program code packet;
    receiving, at the controller, a reference checksum value from a device-external update server device via a second data connection that is different from the first data connection;
    receiving, at the controller, the checksum value built by the processor device;
    determining, by the controller, whether the program code packet is installed on the processor device;
    initiating, by the controller, an installation procedure for installing the program code packet on the processor device upon determining, by the controller, that the checksum value and the reference checksum value are identical and the program code packet is not installed on the processor device; and
    performing, by the controller, a reset of the processor device from outside the processor device after a specified period of time by interrupting an energy supply providing electrical energy to the processor device.

2. The method of claim 1, further comprising:
    sending, by the controller, a release signal to the processor device; and
    initiating, by the processor device, a restart of the processor device upon receiving the release signal.

3. The method of claim 1, further comprising:
    setting, by the controller, an electrical signal to an electrical signal input of the processor device during a restart of the processor device; and
    installing, by the processor device, an operating software (OS) of the processor device with the program code packet by a bootloader of the processor device upon detecting the electrical signal being present at the electrical signal input during the restart.

4. The method of claim 1, wherein the controller is operated with a first operating system (OS) and the processor device is operated with a second OS, wherein the first OS and the second OS are different from each other.

5. The method of claim 1, wherein the controller is provided by a microcontroller (µC).

6. A device comprising a processor device and a controller, wherein the device is configured to perform operations comprising:
    receiving, at the processor device, the program code packet via a first data connection from a device-external data source;
    building, at the processor device, a checksum value in response to the program code packet;
    receiving, at the controller, a reference checksum value from a device-external update server device via a second data connection that is different from the first data connection;
    receiving, at the controller, the checksum value built by the processor device;
    determining, by the controller, whether the program code packet is installed on the processor device;
    initiating, by the controller, an installation procedure for installing the program code packet on the processor device upon determining, by the controller, that the checksum value and the reference checksum value are identical and the program code packet is not installed on the processor device; and
    performing, by the controller, a reset of the processor device from outside the processor device after a specified period of time by interrupting an energy supply providing electrical energy to the processor device.

7. The device of claim 6, wherein the device is one of a control unit for a motor vehicle, a mobile terminal device, and a stationary computing device.

8. A motor vehicle comprising a device, the device comprising: a controller, and a processor device, wherein the device is configured to perform operations comprising:
    receiving, at the processor device, a program code packet via a first data connection from a device-external data source;
    building, at the processor device, a checksum value in response to the program code packet;
    receiving, at the controller, a reference checksum value from a device-external update server device via a second data connection that is different from the first data connection, and the checksum value built by the processor device;
    determining, by the controller, whether the program code packet is installed on the processor device;
    initiating, by the controller, an installation procedure for installing the program code packet on the processor device upon determining, by the controller, that the checksum value and the reference checksum value are identical and the program code packet is not installed on the processor device; and
    performing, by the controller, a reset of the processor device from outside the processor device after a specified period of time by interrupting an energy supply providing electrical energy to the processor device.

9. The motor vehicle of claim 8, wherein the controller is provided by a microcontroller (µC).

10. The motor vehicle of claim 8, wherein the controller is operated with a first operating system (OS) and the processor device is operated with a second OS, wherein the first OS and the second OS are different from each other.

* * * * *